G. J. WESTPHAL.
COTTON CHOPPER.
APPLICATION FILED JUNE 22, 1915.

1,207,455.

Patented Dec. 5, 1916.
2 SHEETS—SHEET 1.

Witnesses
F. L. Gibson

Inventor
George J. Westphal.
By Victor J. Evans
Attorney

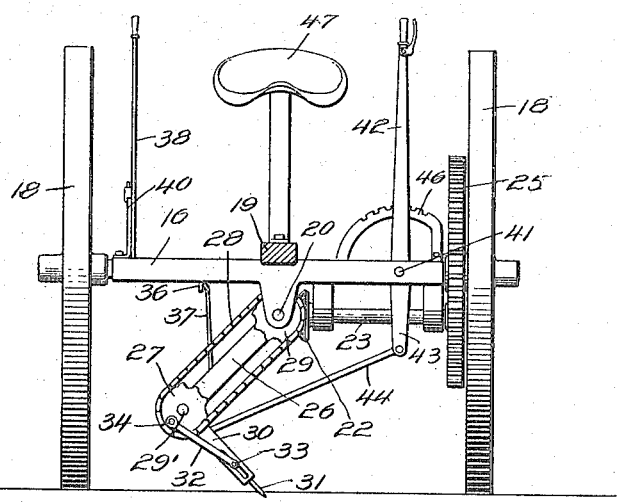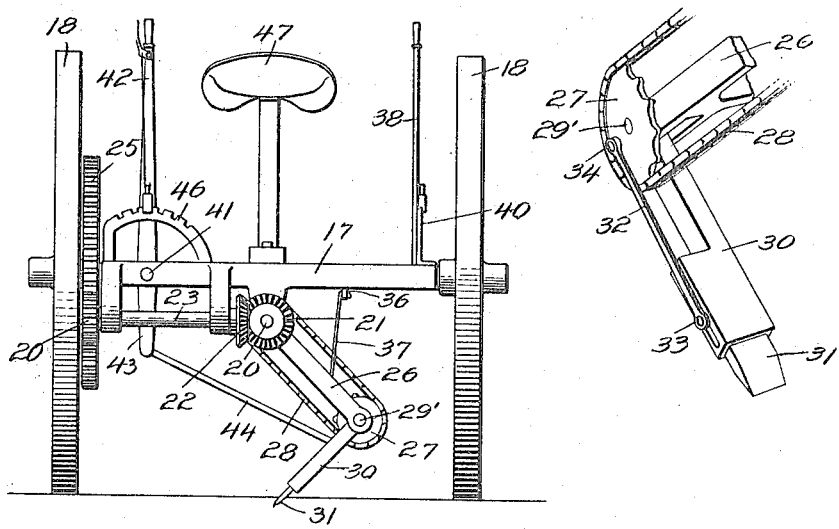

UNITED STATES PATENT OFFICE.

GEORGE J. WESTPHAL, OF OKLAHOMA, OKLAHOMA.

COTTON-CHOPPER.

1,207,455.

Specification of Letters Patent.

Patented Dec. 5, 1916.

Application filed June 22, 1915. Serial No. 35,609.

*To all whom it may concern:*

Be it known that I, GEORGE J. WESTPHAL, a citizen of the United States, residing at Oklahoma, in the county of Oklahoma and State of Oklahoma, have invented new and useful Improvements in Cotton-Choppers, of which the following is a specification.

This invention relates to cotton choppers, and it has particular reference to that class of cotton choppers which are mounted on wheels for convenience in transportation and which are provided with a reciprocatory blade or cutting member operating transversely across the row for the purpose of chopping out superfluous plants, said blade or cutting member being driven by power derived from one of the transporting wheels.

The present invention has for its object to produce a device of the class described in which the cutting member is carried by a guide member pivotally connected with an arm which in turn is pivotally supported on the frame of the machine; means being provided whereby the supporting arm and the guide member may be independently adjusted to effect desired adjustments of the cutting member.

A further object of the invention is to simplify and improve the general construction and the means whereby the cutting member is driven by power derived from one of the transporting wheels.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
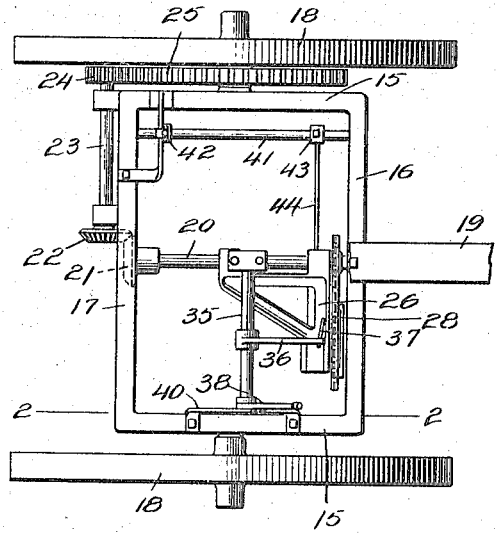
Figure 2:
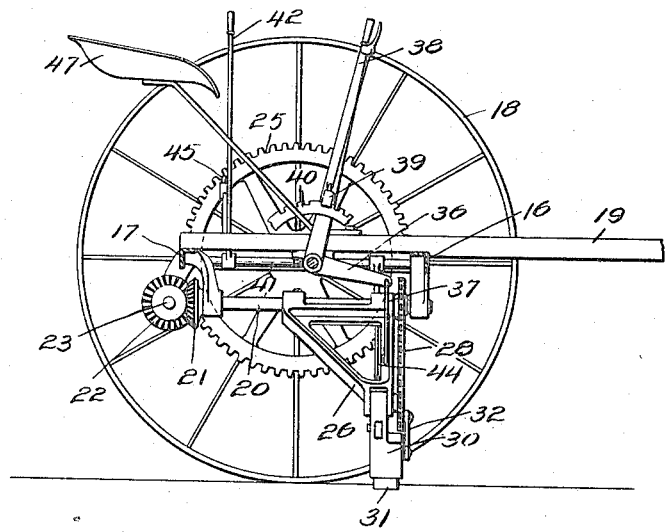

In the drawings, Figure 1 is a top plan view of a machine constructed in accordance with the invention. Fig. 2 is a vertical sectional view taken on the plane indicated by the line 2—2 in Fig. 1. Fig. 3 is a front elevation. Fig. 4 is a rear elevation. Fig. 5 is a perspective detail view of the cutting member and the guide member supporting the same.

Corresponding parts in the several figures are denoted by like characters of reference.

The frame of the improved machine has been shown as being of rectangular form comprising side members 15 and front and rear members 16, 17, the side members being provided with stub axles on which the transporting wheels 18 are mounted for rotation. A tongue 19 extends longitudinally across the frame directly above a shaft 20 which is supported in suitable bearings, said shaft being longitudinally disposed, as shown, and provided at the rear end thereof with a bevel gear 21 meshing with a bevel gear 22 on a transversely disposed shaft 23 having at one end a pinion 24 meshing with a spur wheel 25 which is mounted on one of the ground wheels 18 for rotation therewith, thereby transmitting motion to the longitudinal shaft 20.

Pivoted on the shaft 20 is a supporting device consisting of a bracket 26 at the free end of which a sprocket wheel 27 is supported for rotation, said sprocket wheel being connected by a chain 28 with a sprocket wheel 29 on the shaft 20. The spindle or pivot member 29* on which the sprocket wheel 27 is mounted also supports a pivotally mounted arm or guide member 30 with which a blade or cutting member 31 is slidably connected for reciprocatory movement, said cutting member being driven by means of a pitman 32, one end of which is pivotally connected with said cutting member by a pivot member 33, the other end of said pitman engaging a wrist pin 34 on the sprocket wheel 27.

To support the bracket or supporting member 26 and the guide member 30 in position at various adjustments for operating properly means are provided as follows: A transversely disposed shaft 35 is provided with an arm or crank 36 which is connected by a link 37 with the bracket 26. The shaft 35 is also provided with a hand lever 38 having a stop member 39 that engages a rack segment 40, whereby the lever and the parts controlled thereby may be secured in position at various adjustments. A longitudinally disposed shaft 41 carries a hand lever 42 having a downwardly extending arm 43 which is connected by a link 44 with the guide member 30. The hand lever 42 is provided with a stop member 45 engaging a rack segment 46, whereby the lever and the parts controlled thereby may be secured at various adjustments. The levers 38 and 42 are placed within convenient reach of the driver or operator whose seat 47 has been shown as being mounted in a convenient position on the machine.

From the foregoing description, taken in connection with the accompanying drawings, it will be seen that by proper manipulation of the lever 38, the supporting bracket 26 may be adjusted so as to raise or lower the guide member 30 which is carried thereby. In like manner by proper manipulation of the hand lever 42, the guide member may be adjusted with respect to the supporting member 26 so as to place the cutting member mounted on said guide member at the most convenient angle for successful operation. The row of plants is straddled by the machine, and it will be seen that the location of the longitudinal shaft 20 midway between the sides of the frame, or approximately so, causes the free end of the supporting bracket 26 to be normally placed near one side of the machine, thus positioning the guide member carrying the blade at one side of the row of plants and transversely thereof. It follows that by proper adjustment of the levers the cutting blade may be so positioned that at each stroke thereof, the row of plants will be engaged, and one or more plants will be severed or uprooted, according to the width of the cutting blade which may obviously be varied. From the transporting wheel having the spur wheel 25 motion is transmitted through the shaft 23, miter gearing 22, 21, shaft 20 and transmission chain 28 to the sprocket 27 which actuates the cutting member through the medium of the pitman 32 which imparts to said cutting member a reciprocatory movement, the length of the stroke being determined by the distance of the wrist pin 34 from the axis of the spindle 29. It is obvious that even while the machine is in operation the position of the cutting member may be changed, according to the location of the plants, by proper manipulation of the adjusting levers, and it is also evident that the said cutting member may be conveniently raised to a suitable distance above the ground when the machine is to be transported from one place to another. For interrupting the movement of the cutting member, as when the machine is being transported, a clutch device of well known construction may be used in the transmission means, but as such clutch devices are common and well known in machines of this class it is not considered necessary to particularly illustrate the same.

Having thus described the invention, what is claimed as new, is:—

1. In a cotton chopper, a wheeled frame having a longitudinal shaft situated about midway between the sides of the frame and deriving motion from one of the transporting wheels, a bracket pivoted on said shaft and extending in the direction of one side of the frame, a guide member pivoted on the free end of the bracket and extending in the direction of the medial portion of the frame, a reciprocating cutting member mounted on the guide member, means for adjusting and supporting the bracket and the cutting member, and means for driving the cutting member including a driven wheel supported at the angle between the bracket and the guide member, and a pitman connecting said wheel with the cutting member.

2. In a cotton chopper, a wheeled frame having a longitudinal shaft deriving motion from one of the transporting wheels, a bracket pivoted on the longitudinal shaft and having a spindle at its free end, sprocket wheels on the spindle and on the longitudinal shaft, a chain connecting said sprocket wheels, a guide member pivoted on the spindle and having a reciprocatory cutting member, and a pitman connecting the sprocket mounted on the spindle with the cutting member for reciprocating the latter.

In testimony whereof I affix my signature in presence of two witnesses.

GEORGE J. WESTPHAL.

Witnesses:
JAMES A. KOEHL,
BENNETT S. JONES.

Copies of this patent may be obtained for five cents each, by addressing the "Commissioner of Patents, Washington, D. C."